United States Patent
Horikawa et al.

(10) Patent No.: US 10,112,753 B2
(45) Date of Patent: Oct. 30, 2018

(54) LID ATTACHMENT MEMBER

(71) Applicants: Nifco Inc., Yokosuka-shi (Kanagawa) (JP); Hino Motors, Ltd., Hino-shi (Tokyo) (JP); Kautex Japan Corporation, Hiroshima-shi, Hiroshima (JP)

(72) Inventors: Junpei Horikawa, Yokosuka (JP); Tomohiro Yamanoue, Hino (JP); Yasuhisa Oda, Yokohama (JP)

(73) Assignees: NIFCO INC., Yokosuka-shi, Kanagawa (JP); HINO MOTORS, LTD., Hino-shi, Tokyo (JP); KAUTEX JAPAN CORPORATION, Hiroshima-shi, Hiroshima (JP)

( * ) Notice: Subject to any disclaimer, the term of this patent is extended or adjusted under 35 U.S.C. 154(b) by 236 days.

(21) Appl. No.: 15/024,074

(22) PCT Filed: Sep. 17, 2014

(86) PCT No.: PCT/JP2014/074584
§ 371 (c)(1),
(2) Date: Mar. 23, 2016

(87) PCT Pub. No.: WO2015/045988
PCT Pub. Date: Apr. 2, 2015

(65) Prior Publication Data
US 2016/0251130 A1    Sep. 1, 2016

(30) Foreign Application Priority Data
Sep. 26, 2013 (JP) ................................. 2013-200232

(51) Int. Cl.
*B65D 53/00* (2006.01)
*B65D 53/02* (2006.01)
(Continued)

(52) U.S. Cl.
CPC ........... *B65D 53/02* (2013.01); *F01N 3/2066* (2013.01); *F01N 13/1827* (2013.01); *F16J 13/12* (2013.01);
(Continued)

(58) Field of Classification Search
CPC ........ B65D 53/00; B65D 53/02; B65D 53/04; B65D 53/06; B65D 53/08; F01N 3/2066;
(Continued)

(56) References Cited

U.S. PATENT DOCUMENTS 4,998,639 A * 3/1991 Seizert ................... B60K 15/01
141/368
6,332,555 B1 * 12/2001 Stangier ........... B60K 15/03177
220/319
(Continued)

FOREIGN PATENT DOCUMENTS

| JP | S57-27574 | 2/1982 |
| JP | 2011-007128 | 1/2011 |
| JP | 2011-250544 A | 12/2011 |

OTHER PUBLICATIONS

International Search Report and Written Opinion of Application No. PCT/JP2014/074584 dated Dec. 22, 2014.

*Primary Examiner* — Steven A. Reynolds
*Assistant Examiner* — Javier A Pagan
(74) *Attorney, Agent, or Firm* — Thomas|Horstemeyer, LLP (57) ABSTRACT

A lid attachment member includes: a metal plate that is equipped with an attachment hole to which a lid of a container is to be attached; a raised or recessed seal portion that is formed at, and continuously all the way around, an outer peripheral portion of the metal plate; and a resin member that is integrally formed on the outer peripheral portion of the metal plate, covers the seal portion, and has a (Continued)

back surface side that is configured to be welded to an open portion of the container.

6 Claims, 7 Drawing Sheets

(51) Int. Cl.
    *F16J 13/12*     (2006.01)
    *F01N 3/20*     (2006.01)
    *F01N 13/18*     (2010.01)
    *F16J 15/12*     (2006.01)

(52) U.S. Cl.
    CPC ......... *F16J 15/122* (2013.01); *F01N 2610/02* (2013.01); *F01N 2610/1406* (2013.01); *Y02T 10/24* (2013.01)

(58) Field of Classification Search
    CPC . F01N 3/2006; F01N 3/20; F01N 3/18; F01N 3/10; F01N 3/08; F01N 13/1827; F01N 13/1805; F01N 13/18; F16J 13/12; F16J 13/10; F16J 13/02; F16J 13/00; F16J 15/122; F16J 15/121; F16J 15/12; F16J 15/10
    USPC .......................................................... 220/378
    See application file for complete search history.

(56) References Cited

U.S. PATENT DOCUMENTS

| | | | |
|---|---|---|---|
| 6,516,964 B1* | 2/2003 | Gerhardt | B60K 15/03 220/258.1 |
| 6,533,288 B1* | 3/2003 | Brandner | B60K 15/03 220/304 |
| 8,556,109 B2* | 10/2013 | Fujita | B29C 49/20 220/319 |
| 8,631,933 B2* | 1/2014 | Lee | B65D 47/243 206/219 |
| 9,694,673 B2* | 7/2017 | Beauchaine | B60K 15/03 |
| 9,802,340 B1* | 10/2017 | Anderson | B29C 33/12 |
| 9,842,620 B2* | 12/2017 | Takahashi | G11B 19/2009 |
| 2003/0029871 A1* | 2/2003 | Goto | B60K 15/03 220/562 |
| 2007/0221674 A1* | 9/2007 | Mori | B60K 15/03 220/562 |
| 2016/0375761 A1* | 12/2016 | Horikawa | B60K 15/05 49/276 |
| 2016/0375762 A1* | 12/2016 | Lee | B60K 15/05 296/97.22 |
| 2017/0043660 A1* | 2/2017 | Horikawa | B60K 15/05 |
| 2018/0079297 A1* | 3/2018 | Lee | B60K 15/05 |

* cited by examiner

LID ATTACHMENT MEMBER

CROSS-REFERENCE TO RELATED APPLICATIONS

This application is the National Stage of International Application No. PCT/JP2014/074584, filed 17 Sep. 2014, having the title "COVER BODY ATTACHING MEMBER" which claims the benefit of and priority to Japanese Application No. 2013-200232, filed on 26 Sep. 2013, the contents of all of which are incorporated by reference as if fully set forth herein.

TECHNICAL FIELD

The present invention relates to a lid attachment member.

BACKGROUND ART

Japanese Patent Application Laid-open (JP-A) No. 2011-7128 discloses, as a lid attachment member that is welded to an open portion of a container and to which a lid of the container is to be attached, a unit mounting plate that is equipped with a metal plate portion formed in an annular shape and a plate holding portion made of resin and disposed on the outer peripheral portion of the metal plate portion.

SUMMARY OF INVENTION

Technical Problem

In the unit mounting plate described above, in order to keep fluid (aqueous urea) in the container from penetrating through, and leaking outside the container from, the joint section between the metal plate portion and the plate holding portion, a silicon sealant is applied to the joint section. However, if there is a break in the sealant even in one place, there is the concern that the fluid will penetrate through and leak out from that break. Furthermore, in order to reduce the number of man-hours, a lid attachment member that can control penetration leakage even without a sealant being applied is desired.

In consideration of the circumstances described above, the present invention provides a lid attachment member that can control penetration leakage even without a sealant being applied.

Solution to Problem

A lid attachment member pertaining to a first aspect includes: a metal plate that is equipped with an attachment hole to which a lid of a container is to be attached; a raised or recessed seal portion that is formed at, and continuously all the way around, an outer peripheral portion of the metal plate; and a resin member that is integrally formed on the outer peripheral portion of the metal plate, covers the seal portion, and has a back surface side that is configured to be welded to an open portion of the container.

According to the lid attachment member pertaining to the first aspect, the metal plate is equipped with the attachment hole to which the lid of the container is to be attached. Furthermore, the raised or recessed seal portion is formed at, and continuously all the way around, the outer peripheral portion of the metal plate, and the seal portion is coated by the resin member integrally formed with the metal plate. Because of this, when the heated resin member cools, hardens, and contracts at the time when the metal plate and the resin member are integrally molded, the resin member becomes anchored to the raised section or the recessed section of the metal plate and comes into tight contact with, all the around, the metal plate. In this way, fluid in the container can be kept from penetrating through and leaking out even without a sealant being applied.

Furthermore, the back surface side of the resin member is welded to the open portion of the container and becomes integrated with the container, so the fluid also does not penetrate through and leak out from the joint section between the resin member and the container.

A lid attachment member pertaining to a second aspect is the lid attachment member pertaining to the first aspect, wherein the seal portion is an annular groove formed at at least one of a front surface or a back surface of the metal plate, and an angle between a groove bottom surface of the annular groove and a groove wall surface at an outer peripheral side of the annular groove is equal to or less than 90 degrees.

According to the lid attachment member pertaining to the second aspect, the metal plate and the resin member can be more easily sealed compared to a case where a sealant is applied. Furthermore, by making the angle between the groove bottom surface of the annular groove and the groove wall surface on the outer peripheral side of the annular groove equal to or less than 90 degrees, the resin member can be kept from coming out from the annular groove when the resin member that has entered the annular groove contracts toward the outer peripheral side. That is, the watertightness of the tightly contacting surfaces of the metal plate and the resin member can be kept from deteriorating.

A lid attachment member pertaining to a third aspect is the lid attachment member pertaining to the second aspect, wherein a groove wall surface at an inner peripheral side of the annular groove slopes in a direction in which a thickness of the metal plate decreases, from the inner peripheral side to the outer peripheral side of the annular groove.

According to the lid attachment member pertaining to the third aspect, by disposing the sloping surface, it becomes easier for the resin member to enter the annular groove. Because of this, the metal plate and the resin member can more reliably be brought into tight contact with each other compared to a case where the sloping surface is not disposed.

A lid attachment member pertaining to a fourth aspect is the lid attachment member pertaining to the second aspect or the third aspect, wherein a plurality of annular grooves are formed at the metal plate.

According to the lid attachment member pertaining to the fourth aspect, water tightness and pressure resistance are enhanced compared to a case where only one annular groove is formed, and the fluid in the container can be kept from penetrating through and leaking out.

A lid attachment member pertaining to a fifth aspect is the lid attachment member pertaining to the fourth aspect, wherein the annular grooves are disposed such that there is at least one each in a front surface and a back surface of the metal plate and are disposed in positions in which they do not coincide with each other in a thickness direction.

According to the lid attachment member pertaining to the fifth aspect, by disposing the annular grooves in positions in which they do not coincide with each other in the thickness direction of the metal plate, the thickness of the metal plate can be kept a certain thickness or more. Because of this, penetration leakage of the fluid can be controlled while ensuring the rigidity of the metal plate.

Advantageous Effects of Invention

Because the present invention is given the configuration described above, it can provide a lid attachment member that can control penetration leakage even without a sealant being applied.

DESCRIPTION OF EMBODIMENTS

First Embodiment

A lid attachment member 10 pertaining to a first embodiment of the present invention, and an aqueous urea tank 100 equipped with the lid attachment member 10, will be described below with reference to the drawings. It should be noted that arrow Z in FIG. 1 indicates an upward and downward direction of the aqueous urea tank 100 and that arrow R in FIG. 4 to FIG. 7 indicates an outward direction (an outer peripheral side) in a radial direction of the lid attachment member 10. Furthermore, the surface of the lid attachment member 10 that faces up in a state in which the lid attachment member 10 has been attached will be called a "front surface" and the surface of the lid attachment member 10 that faces down will be called a "back surface".

(Configuration of Aqueous Urea Tank 100)

Figure 1:
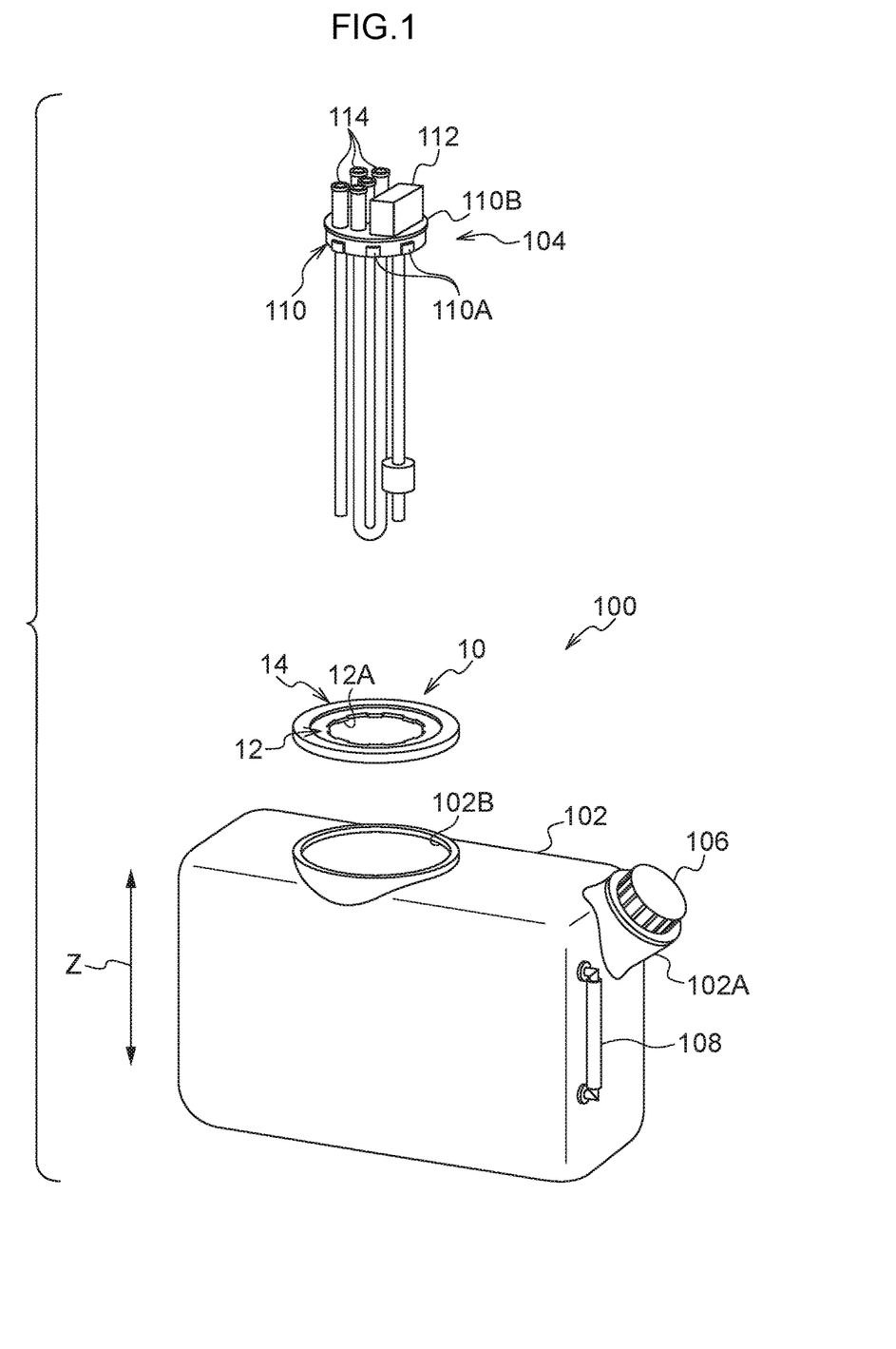
FIG. 1 is an exploded perspective view of an aqueous urea tank equipped with a lid attachment member pertaining to a first embodiment of the present invention.

The aqueous urea tank 100 of the present embodiment relates to a urea SCR system that is an exhaust gas purification technology that produces a catalytic reduction reaction between nitrogen oxides (NOx) in exhaust gas and aqueous urea, which is a reducing agent, to thereby neutralize the NOx, and the aqueous urea tank 100 is installed in a vehicle and used. As shown in FIG. 1, the aqueous urea tank 100 is configured to mainly include a tank body 102, in which aqueous urea is stored, and the lid attachment member 10.

The tank body 102 is a member made of resin and formed in a hollow substantially cuboidal shape, and is configured to be able to store fluid inside. In the present embodiment, as an example, the tank body 102 is used as a container for storing urea supplied to a urea SCR system, but the tank body 102 is not limited to this and may also be used as a container for storing another fluid such as fuel.

A substantially tubular supply portion 102A for supplying the aqueous urea is formed in one corner portion of the upper end portion of the tank body 102, and a blue cap 106 is screwed into a supply opening in the distal end of the supply portion 102A to close off the supply opening. Furthermore, a fluid level gauge 108 is disposed on a side surface of the tank body 102. The fluid level gauge 108 is a gauge for checking the amount of the aqueous urea stored in the tank body 102 and is configured so that the height of the fluid level can be visually checked.

Moreover, an open portion 102B is formed in the upper surface of the tank body 102. The open portion 102B is circular as seen in a plan view and is formed with a larger diameter than that of the supply opening in the supply portion 102A, and the lid attachment member 10 is welded to this open portion 102B.

Figure 2:
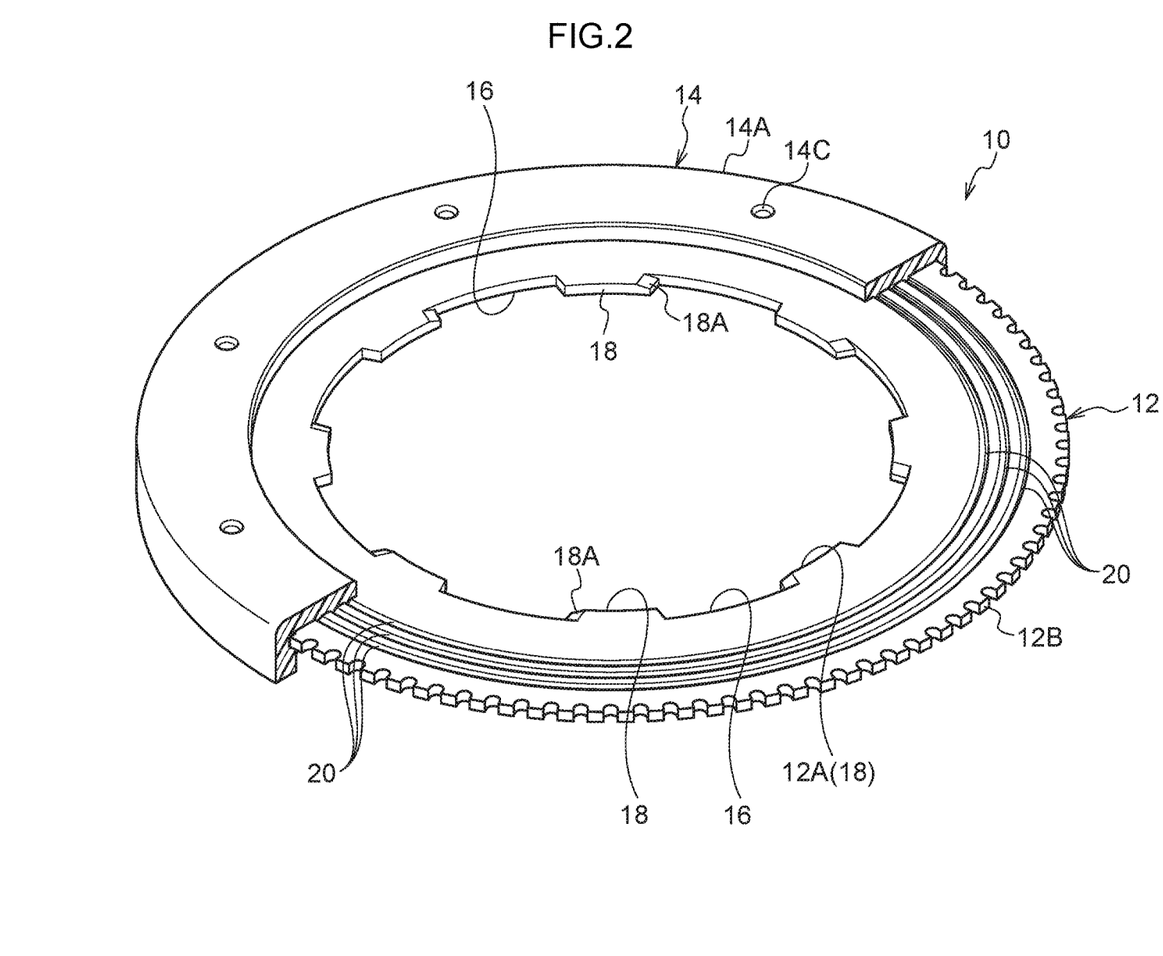
FIG. 2 is a partially cutaway perspective view showing a front surface of the lid attachment member pertaining to the first embodiment of the present invention.

The lid attachment member 10 is a substantially annular member and, as shown in FIG. 2, is configured to mainly include a metal plate 12 and a resin member 14. The metal plate 12 is formed in a disc shape, and an attachment hole 12A for attaching a pump module 104 described later is formed in the central portion of the metal plate 12. The attachment hole 12A is a substantially circular hole, and the shape of the hole edge of the attachment hole 12A is formed in a crenulated shape because of plural cutout portions 16 formed in the hole wall of the attachment hole 12A.

Furthermore, the resin member 14 is disposed on the outer peripheral portion of the metal plate 12. The resin member 14 is formed integrally with the metal plate 12 by insert molding, and the lid attachment member 10 is attached to the tank body 102 by welding the back surface side of the resin member 14 to the open portion 102B of the tank body 102. Details about the configuration of the lid attachment member 10 will be described later.

As shown in FIG. 1, a pump module 104 serving as a lid is attached from above to the aqueous urea tank 100 equipped with the tank body 102 and the lid attachment member 10. The pump module 104 is configured to mainly include a body portion 110 that engages with the lid attachment member 10, a fluid level sensor 112 that is disposed on the body portion 110, and plural pipes 114 that run through the body portion 110.

The body portion 110 is formed in a substantially cylindrical shape and is formed with a slightly smaller diameter than that of the attachment hole 12A in the lid attachment member 10. Furthermore, plural projections 110A are formed on the outer peripheral surface of the body portion 110. The projections 110A correspond to the shapes of the cutout portions 16 of the lid attachment member 10, and the body portion 110 can be inserted into the lid attachment member 10 by aligning the positions of the projections 110A and the cutout portions 16. Furthermore, a flange portion 110B having a larger diameter than that of the attachment hole 12A in the lid attachment member 10 is formed on the upper end portion of the body portion 110, and an O-ring not shown in the drawings is attached to the undersurface side of the flange portion 110B.

The fluid level sensor 112, which detects the fluid level, is attached to the upper surface of the body portion 110. Furthermore, the plural pipes 114 run through the body portion 110 in the up and down direction. Examples of the plural pipes 114 include an aqueous urea supply pipe that pumps the aqueous urea stored inside the tank body 102 and delivers the aqueous urea to the urea SCR system, a return pipe that returns the aqueous urea from the urea SCR system to the tank body 102, a breather pipe for air ventilation, and a coolant water pipe that allows engine coolant heated by a radiator not shown in the drawings to pass through it in order to prevent the aqueous urea from freezing.

Here, when attaching the pump module 104 to the lid attachment member 10, the projections 110A are inserted below the metal plate 12 in a state in which the positions of the projections 110A of the body portion 110 and the cutout portions 16 have been aligned. Then, the O-ring of the flange portion 110B and the metal plate 12 of the lid attachment member 10 are brought into contact with each other. Then, by rotating the pump module 104 a predetermined angle about its axis while pushing on the pump module 104 in this state, the positions of the projections 110A and the cutout portions 16 go out of alignment so that the projections 110A become anchored on the metal plate 12 and the pump module 104 cannot be pulled off. At this time, because the O-ring is interposed between and seals the metal plate 12 and the flange portion 110B, the aqueous urea stored inside the tank body 102 can be kept from leaking from between the lid attachment member 10 and the pump module 104.

It should be noted that although in the present embodiment the fluid level sensor 112 is attached to the pump module 104, the pump module 104 is not limited to this and another sensor may also be attached. For example, a concentration sensor that detects the concentration of the aqueous urea may also be attached, or another sensor may also be attached. Furthermore, a sensor unit comprising a collection of plural sensors may also be attached. Moreover, although in the present embodiment five pipes 114 run through and are attached to the body portion 110, the number of pipes attached to the body portion 110 is not limited to this and a greater number of pipes 114 may also be attached. Furthermore, the number of pipes 114 may also be four or less.

(Configuration of Lid Attachment Member 10)

Next, the configuration of the lid attachment member 10 of the present embodiment will be described. As shown in FIG. 2, the metal plate 12 configuring the lid attachment member 10 is a plate-shaped member made of metal such as stainless steel, and as mentioned above the attachment hole 12A is formed in the central portion of the metal plate 12.

The plural cutout portions 16 are formed at predetermined intervals in the hole wall of the attachment hole 12A. In the present embodiment, as an example, eight cutout portions 16 are formed, but the number of cutout portions 16 is not limited to this and can be freely set in accordance with the shape of the pump module 104.

The sections between the plural cutout portions 16 are anchor pieces 18 for anchoring the projections 110A of the pump module 104. The anchor pieces 18 are formed in substantially circular arc shapes, and a tapered portion 18A that slopes toward the back surface side heading toward its tip is formed on one lengthwise direction end portion of each of the anchor pieces 18. Because of this, when the pump module 104 has been rotated in a state in which the metal plate 12 and the projections 110A have been bought into contact with each other, the projections 110A can be smoothly guided to the cutout portions 16.

Plural recessed portions 12B are formed all the way around the outer peripheral edge of the metal plate 12, and the outer peripheral edge of the metal plate 12 has a crenulated shape because of the recessed portions 12B. Because of this, the resin member 14 enters the recessed portions 12B, and the metal plate 12 and the resin member 14 are kept from rotating relative to each other. It should be noted that the shape of the outer peripheral edge of the metal plate 12 is not limited to this and may also be another shape provided that it is a shape by which relative rotation can be controlled.

Figure 3:
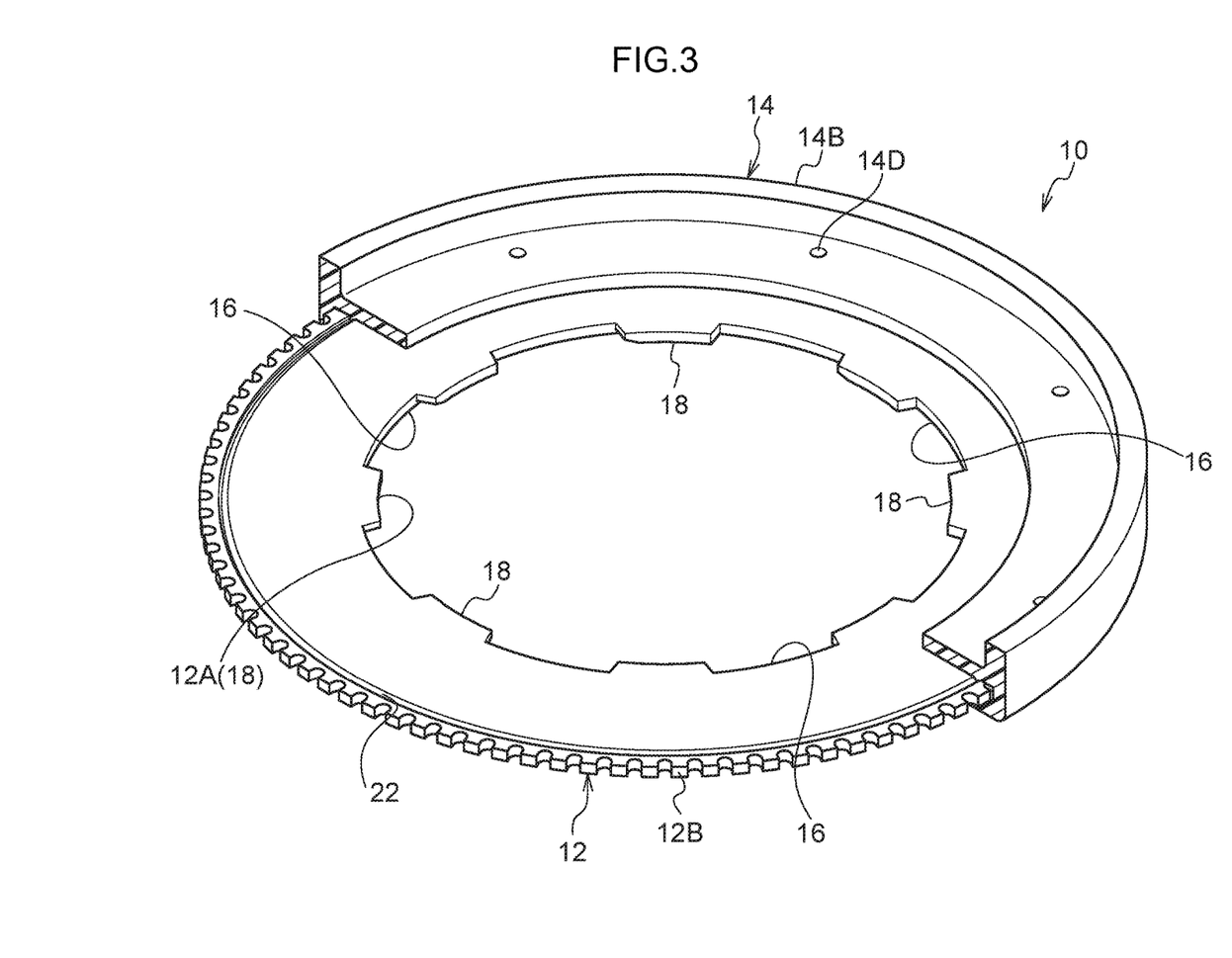
FIG. 3 is a partially cutaway perspective view showing a back surface of the lid attachment member pertaining to the first embodiment of the present invention.

Annular grooves 20 serving as a seal portion are formed in the outer peripheral portion of the metal plate 12. The annular grooves 20 are formed in a recessed manner in, and continuously all the around, at least one of the front surface and the back surface of the metal plate 12; in the present embodiment, as an example, three annular grooves 20 are formed in the front surface of the metal plate 12. Furthermore, as shown in FIG. 3, one annular groove 22 is formed in the back surface of the metal plate 12. It should be noted that the lid attachment member 10 is not limited to this, that it suffices for the annular groove 20 to be formed in at least one of the front surface and the back surface of the metal plate 12, and that the lid attachment member 10 may also have a configuration where, for example, one annular groove 20 is formed in just the front surface of the metal plate 12.

Figure 4:
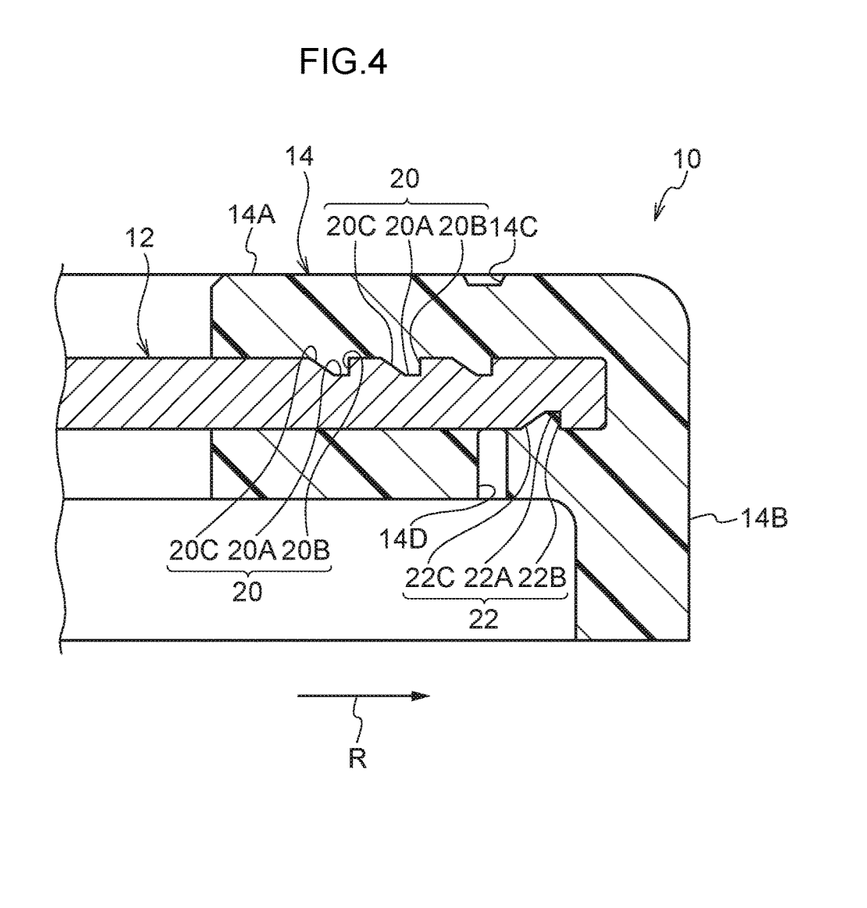
FIG. 4 is an enlarged cross-sectional view, cut along a radial direction, of the lid attachment member pertaining to the first embodiment of the present invention.

Here, as shown in FIG. 4, the annular groove 22 formed in the back surface of the metal plate 12 is positioned on the outer peripheral side of the three annular grooves 20 formed in the front surface of the metal plate 12. Furthermore, the annular groove 22 in the back surface is formed in a position in which it does not coincide with the annular grooves 20 in the front surface in the thickness direction of the metal plate 12. Because of this, the thickness of the metal plate 12 can be kept a certain thickness or more, and deterioration in the rigidity of the metal plate 12 can be controlled. That is, even when pressure acts on the metal plate 12 at the time of molding, warping of the metal plate 12 can be avoided.

It should be noted that although in the present embodiment the annular groove 22 in the back surface of the metal plate 12 is formed on the outer peripheral side of the annular grooves 20 in the front surface, the annular groove 22 is not limited to this and, for example, may also be formed on the inner peripheral side of the three annular grooves 20 in the front surface. Furthermore, the annular groove 22 in the back surface may also be formed in a position between the annular grooves 20 in the front surface.

Here, each of the annular grooves 20 is configured to include a groove bottom surface 20A, a groove wall surface 20B, and a groove wall surface 20C, and the groove bottom surface 20A is formed substantially parallel to the front surface and the back surface of the metal plate 12. Furthermore, the groove wall portion 20B on the outer peripheral side of each annular groove 20 is formed at an angle equal to or less than 90 degrees relative to the groove bottom surface 20A; in the present embodiment, as an example, the groove wall surface 20B is formed in such a way that the angle formed by the groove bottom surface 20A and the groove wall surface 20B of each annular groove 20 is a right angle.

Furthermore, the groove wall surface 20C on the inner peripheral side of each annular groove 20 is a sloping surface that slopes in a direction (downward in the drawings) in which the thickness of the metal plate 12 decreases heading from the inner peripheral side to the outer peripheral side. The same is also true of the annular groove 22 in the back surface, so a groove bottom surface 22A of the annular groove 22 and a groove wall surface 22B on the radial direction outside of the annular groove 22 are formed in a right angle, and a groove wall surface 22C on the radial direction inside of the annular groove 22 is a sloping surface that slopes in a direction (upward in the drawings) in which the thickness of the metal plate 12 decreases heading from the inner peripheral side to the outer peripheral side.

As shown in FIG. 2 and FIG. 3, the resin member 14, which is made of a thermoplastic resin, is formed on, and continuously all the way around, the outer peripheral portion of the metal plate 12. As shown in FIG. 4, the resin member 14 is equipped with a coating portion 14A, which is cross-sectionally substantially C-shaped and coats the outer peripheral portion of the metal plate 12, and a weld portion 14B, which extends from the radial direction outside end portion of the coating portion 14A toward the back surface side.

The coating portion 14A coats the annular grooves 20 and the annular groove 22 in the metal plate 12, and recessed portions 14C are disposed in the front surface side of the coating portion 14A. The recessed portions 14C are formed in positions of gates of a mold using in the insert molding. Furthermore, recessed portions 14D are formed in the back surface side of the coating portion 14A. The recessed portions 14D are formed by support rods that support the metal plate 12 at the time of the insert molding, and the recessed portions 14D run through the resin member 14 and reach the metal plate 12. It should be noted that the recessed portions 14C and the recessed portions 14D are not particularly necessary. For this reason, the recessed portions 14C and the recessed portions 14D may also be filled with the resin member 14.

Here, the weld portion 14B of the resin member 14 is formed with substantially the same diameter as that of the open portion 102B of the tank body 102, and is formed in such a way that the weld portion 14B can be welded to the open portion 102B (see FIG. 1). In the present embodiment, as an example of the welding method, hot plate welding, in which the weld portion 14B is heated by a heated platen, melted, and welded to the open portion 102B, is employed, but the welding method is not limited to this, and the weld portion 14B may also be welded using another method. For example, ultrasonic welding or spin welding may also be employed.

(Action and Effects)

Next, the action and effects of the lid attachment member 10 of the present embodiment will be described in accordance with the process of forming the lid attachment member 10 by insert molding. First, the metal plate 12 is set in a mold not shown in the drawings. At this time, the back surface side of the metal plate 12 is supported by the support rods so that the metal plate 12 can be kept from warping at the time of the molding.

After the metal plate 12 has been set in the mold, the heated resin member 14 is injected inside the mold from plural gates disposed in the mold. It should be noted that, in the present embodiment, eight gates are disposed at equidistant intervals along the circumferential direction of the metal plate 12, and the resin member 14 is injected from the positions of the recessed portions 14C shown in FIG. 2. For this reason, the resin member 14 can be uniformly injected into the mold.

Figure 5:
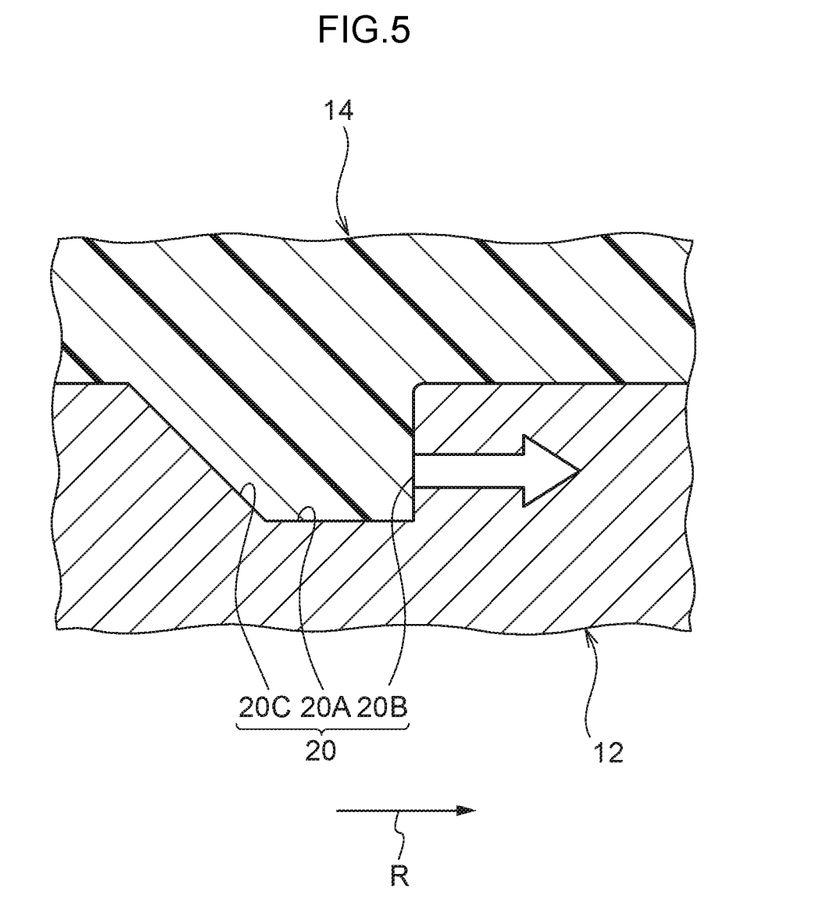
FIG. 5 is an enlarged cross-sectional view, cut along the radial direction, showing stress acting on a metal plate from a resin member pertaining to the first embodiment of the present invention.

Next, as shown in FIG. 5, the resin member 14 injected inside the mold spreads inside the mold and enters the annular grooves 20 formed in the metal plate 12. At this time, because the groove wall surfaces 20C on the inner peripheral sides of the annular grooves 20 are sloping surfaces that slope in a direction in which the thickness decreases heading from the inner peripheral side to the outer peripheral side, it is easier for the resin member 14 to enter the annular grooves 20 because of the sloping surfaces.

Then, the resin member injected into the mold cools and hardens, so that the resin member 14 and the metal plate 12 become integrated and the lid attachment member 10 is obtained. Here, as the resin member 14 is cooled, the resin member 14 contracts towards the outer peripheral side where the weight is greater. For this reason, stress acts in the direction of the arrow in the drawing on the metal plate 12 from the resin member 14 in the annular grooves 20, and the resin member 14 comes into tight contact with the groove wall surfaces 20B on the outer peripheral sides of the annular grooves 20. In the way described above, the resin member 14 and the metal plate 12 are sealed at the groove wall surfaces 20B on the outer peripheral sides of the annular grooves 20, and water tightness can be obtained.

In particular, by making the angle formed by the groove bottom surfaces 20A and the groove wall surfaces 20B equal to or less than 90 degrees like in the present embodiment, the water tightness of the tightly contacting surfaces of the resin member 14 and the metal plate 12 can be kept from deteriorating. That is, in a case where the angle formed by the groove bottom surfaces 20A and the groove wall surfaces 20B is greater than 90 degrees, the resin member 14 ends up moving upward along the groove wall surfaces 20B when the resin member 14 contracts, and there is the concern that gaps will form between the groove wall surfaces 20B and the resin member 14 and/or that the resin member 14 will come out from the annular grooves 20. To address this, by making the angle formed by the groove bottom surfaces 20A and the groove wall surfaces 20B equal to or less than 90 degrees, the resin member 14 and the groove wall surfaces 20B come into tight contact with each other so that deterioration in water tightness can be controlled.

Furthermore, in the present embodiment, the annular groove 22 is also formed in the back surface side of the metal plate 12, so the resin member 14 and the metal plate 12 are sealed at the groove wall surface 22B on the outer peripheral side of the annular groove 22. Because of this, for example, even if the aqueous urea stored inside the tank body 102 penetrates through and leaks out from the joint section between the metal plate 12 and the resin member 14, the penetration is checked at the sealed groove wall surface 22B so that penetration leakage can be controlled. Additionally, in a case where the watertight capability of the groove wall surface 22B has deteriorated due to degradation of the lid attachment member 10 over time, it is conceivable for the aqueous urea to come around to the front surface side by way of the groove wall surface 22B, but because the groove wall surfaces 20B of the three annular grooves 20 formed in the front surface of the metal plate 12 are sealed, the aqueous urea can be kept from penetrating through and leaking outside the aqueous urea tank 100. Moreover, aqueous urea that has gasified inside the aqueous urea tank 100 can also be kept from leaking outside, so odor that occurs as a result of the urea being decomposed also does not leak into the vehicle.

Furthermore, in the lid attachment member 10 of the present embodiment, it is not necessary to apply a sealant to the joint section between the resin member 14 and the metal plate 12, so the number of man-hours can be reduced, and material costs and manufacturing costs can be reduced.

Furthermore, the lid attachment member 10 is welded to the open portion 102B of the tank body 102, so the aqueous urea stored in the tank body 102 also does not penetrate through and leak out from the joint section between the lid attachment member 10 and the tank body 102.

It should be noted that although in the present embodiment the lid attachment member 10 is formed in an annular shape, the shape of the lid attachment member 10 is not limited to this and may also be appropriately changed in accordance with the shape of the open portion 102B of the tank body 102. For example, the outer shape may also be rectangular. Furthermore, in the present embodiment, the annular grooves 20 are formed, but the shape of the grooves is not limited to being annular provided that the grooves are formed continuously all the way around, and the grooves may also be grooves of another shape.

Moreover, in the present embodiment, the groove wall surfaces 20C on the inner peripheral sides of the annular grooves 20 are sloping surfaces, but the groove wall surfaces 20C do not have to be sloping surfaces provided that the resin member 14 enters the annular grooves 20 at the time of the molding; for example, the groove wall surfaces 20C may also be formed in such a way that the angles formed by the groove bottom surfaces 20A and the groove wall surfaces 20C are right angles.

Second Embodiment

Figure 6:
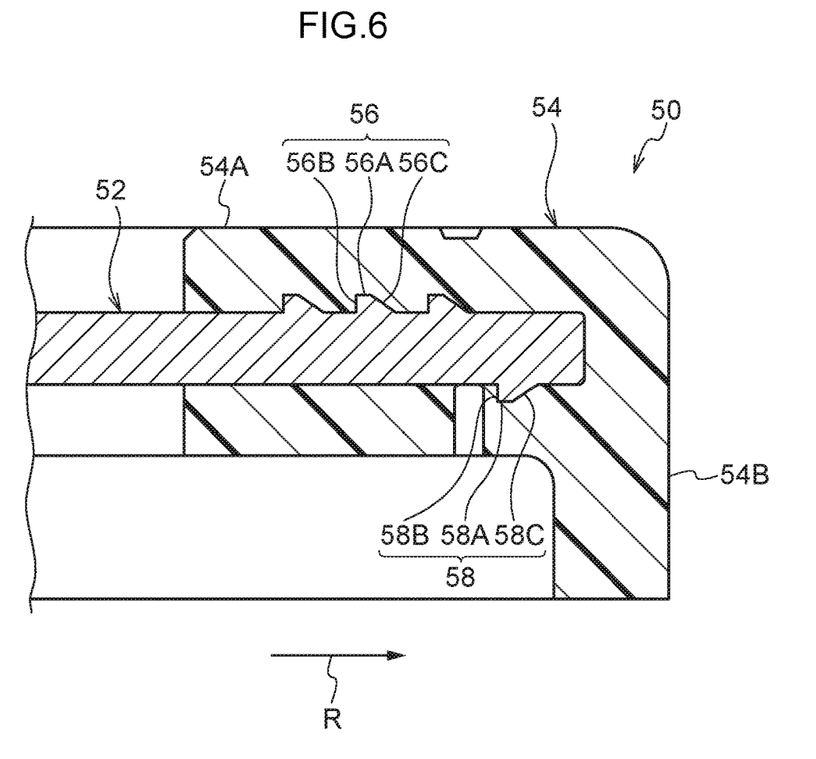
FIG. 6 is an enlarged cross-sectional view, cut along the radial direction, showing a lid attachment member pertaining to a second embodiment of the present invention.

Next, a lid attachment member 50 pertaining to a second embodiment of the present invention will be described. It should be noted that the overall configuration of the lid attachment member 50 of the present embodiment is the same as that of the first embodiment, so illustration of the entire lid attachment member 50 will be omitted and just the relevant portions will be illustrated and described. As shown in FIG. 6, the lid attachment member 50 of the present embodiment is configured to include a metal plate 52 and a resin member 54, and the resin member 54 is integrally formed on the outer peripheral portion of the metal plate 52 by insert molding.

Here, annular projections 56 and an annular projection 58 serving as a seal portion are formed on the outer peripheral portion of the metal plate 52. The annular projections 56 and the annular projection 58 are formed in a raised manner on, and continuously all the way around, the metal plate 52, and three annular projections 56 are formed on the front surface of the metal plate 52. Furthermore, one annular projection 58 is formed on the back surface of the metal plate 52. It should be noted that the lid attachment member 50 is not limited to this and that it suffices for an annular projection 56 to be formed on at least one of the front surface and the back surface of the metal plate 52.

Furthermore, in the present embodiment, the thickness of the metal plate 52 can be ensured even in a case where annular projections 56 are formed in the same positions in the thickness direction on the front surface and the back surface of the metal plate 52.

Here, each of the annular projections 56 is configured to include a top portion 56A, a vertical portion 56B, and a sloping portion 56C. The top portion 56A is formed substantially parallel to the front surface and the back surface of the metal plate 52, and the vertical portion 56B configures a wall surface on the inner peripheral side of the annular projection 56. Furthermore, the angle formed by the vertical portion 56B and the front surface of the metal plate 52 is set equal to or less than 90 degrees; in the present embodiment, as an example, the angle formed by the vertical portion 56B and the front surface of the metal plate 52 is a right angle.

Moreover, the sloping portion 56C configures a wall surface on the outer peripheral side of the annular projection 56 and slopes downward in the drawing heading from the top portion 56A outward in the radial direction. It should be noted that the annular projection 58 on the back surface of the metal plate 12 is likewise equipped with a top portion 58A, a vertical portion 58B, and a sloping portion 58C, and the angle formed by the vertical portion 58B and the back surface of the metal plate 52 is set equal to or less than 90 degrees. Furthermore, the sloping portion 58C configures a wall surface on the outer peripheral side of the annular projection 58 and slopes upward in the drawing heading from the top portion 58A outward in the radial direction.

The resin member 54 is equipped with a coating portion 54A, which is cross-sectionally substantially C-shaped and coats the outer peripheral portion of the metal plate 52, and a weld portion 54B, which extends from the radial direction outside of the coating portion 54A toward the back surface side. Furthermore, the coating portion 54A coats the annular projections 56 and the annular projection 58 of the metal plate 52.

According to the lid attachment member 50 of the present embodiment, the resin member 54 that has cooled and hardened at the time of the insert molding contracts toward the outer peripheral side and becomes anchored to, and comes into tight contact with, the vertical portions 56B of the annular projections 56. In the way described above, the resin member 54 and the metal plate 52 are sealed at the vertical portions 56B of the annular projections 56 so that water tightness can be obtained. Action other than this is the same as in the first embodiment.

Third Embodiment

Figure 7:
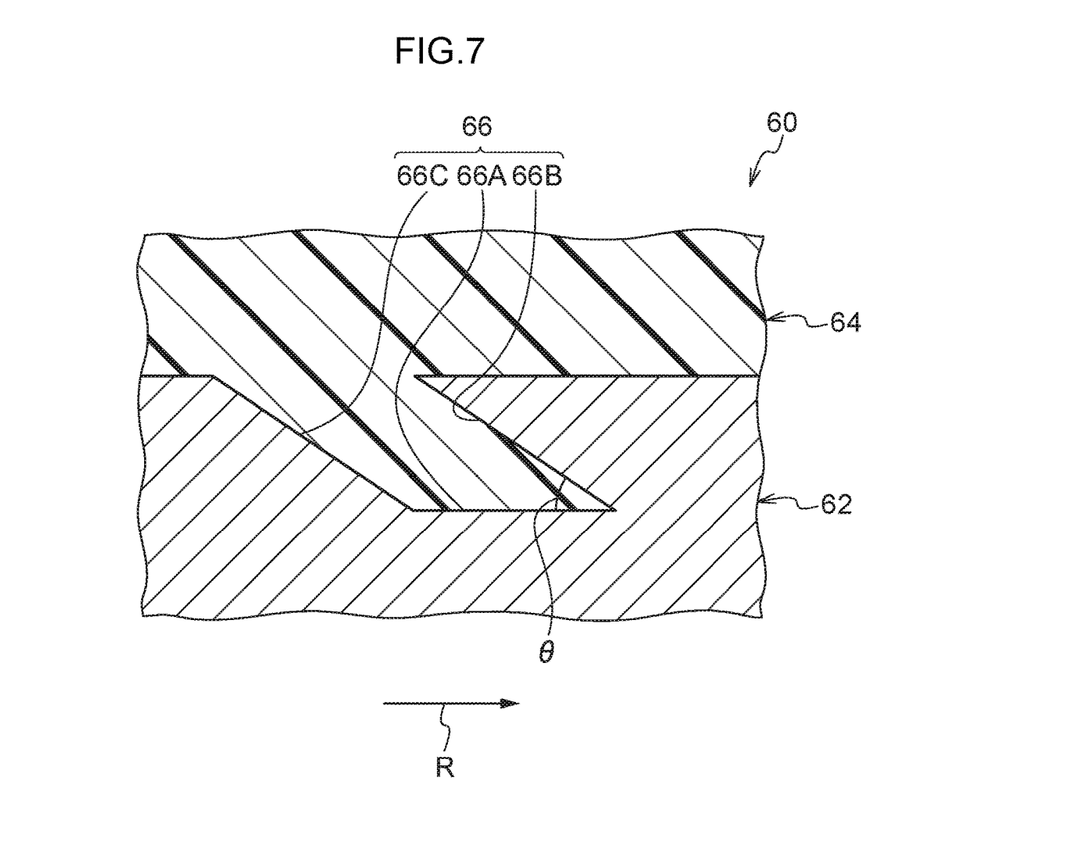
FIG. 7 is an enlarged cross-sectional view, cut along the radial direction, showing an annular groove of a lid attachment member pertaining to a third embodiment of the present invention.

Next, a lid attachment member 60 pertaining to a third embodiment of the present invention will be described. It should be noted that the lid attachment member 60 of the present embodiment is the same as that of the first embodiment with the exception of an annular groove 66, so just the annular groove 66 will be illustrated and described. As shown in FIG. 7, the lid attachment member 60 of the present embodiment is configured to include a metal plate 62 and a resin member 64, and the annular groove 66 is formed in the front surface of the metal plate 62.

The annular groove 66 is configured to include a groove bottom surface 66A, a groove wall surface 66B, and a groove wall surface 66C, and the groove bottom surface 66A is formed substantially parallel to the front surface and the back surface of the metal plate. Furthermore, the groove wall surface 66B on the outer peripheral side of the annular groove 66 is formed sloping relative to the groove bottom surface 66A, and an angle $\theta$ formed by the groove bottom surface 66A and the groove wall surface 66B is formed to be an acute angle. In the present embodiment, as an example, the angle $\theta$ is formed to be 30 degrees.

The groove wall surface 66C on the inner peripheral side of the annular groove 66 is a sloping surface that slopes in a direction (downward in the drawing) in which the thickness of the metal plate decreases heading from the inner peripheral side to the outer peripheral side. It should be noted that although in the present embodiment, as an example, the groove wall surface 66B on the outer peripheral side of the annular groove 66 and the groove wall surface 66C on the inner peripheral side of the annular groove 66 are formed substantially parallel to each other, the groove wall surface 66B and the groove wall surface 66C are not limited to this, and their angles of inclination may also be set to mutually different angles.

According to the lid attachment member 60 of the present embodiment, the annular groove 66 is formed in such a way that the angle formed by the groove bottom surface 66A and the groove wall surface 66B is an acute angle, so the resin member 64 that has cooled and hardened at the time of the insert molding penetrates into the annular groove 66 and can enhance the water tightness. Action other than this is the same in the first embodiment.

The first embodiment to the third embodiment of the present invention have been described above, but the present invention is not limited to these embodiments and of course can be implemented in a variety of ways without departing from the spirit of the present invention. For example, the annular groove 20 of the first embodiment and the annular projection 56 of the second embodiment may also be combined to form the metal plate.

The disclosure of Japanese Patent Application No. 2013-200232 filed on Sep. 26, 2013 is incorporated in its entirety herein by reference.

All documents, patent applications, and technical standards mentioned in this specification are incorporated herein by reference to the same extent as if each individual document, patent application, or technical standard was specifically and individually indicated to be incorporated by reference.

The invention claimed is:

1. A lid attachment member comprising:
a metal plate that is equipped with an attachment hole to which a lid of a container is to be attached;
a raised or recessed seal portion that is formed at, and continuously all the way around, an outer peripheral portion of the metal plate; and
a resin member that is integrally formed on the outer peripheral portion of the metal plate, covers the seal portion, and has a back surface side that is configured to be welded to an open portion of the container, wherein
the seal portion is an annular groove formed at at least one of a front surface or a back surface of the metal plate, and
an angle between a groove bottom surface of the annular groove and a groove wall surface at an outer peripheral side of the annular groove is equal to or less than 90 degrees.

2. The lid attachment member according to claim 1, wherein a groove wall surface at an inner peripheral side of the annular groove slopes in a direction in which a thickness of the metal plate decreases, from the inner peripheral side to the outer peripheral side of the annular groove.

3. The lid attachment member according to claim 2, wherein a plurality of annular grooves are formed at the metal plate.

4. The lid attachment member according to claim 3, wherein the annular grooves are disposed such that there is at least one each in a front surface and a back surface of the metal plate and are disposed in positions in which they do not coincide with each other in a thickness direction.

5. The lid attachment member according to claim 1, wherein a plurality of annular grooves are formed at the metal plate.

6. The lid attachment member according to claim 5, wherein the annular grooves are disposed such that there is at least one each in a front surface and a back surface of the metal plate and are disposed in positions in which they do not coincide with each other in a thickness direction.

* * * * *